US000001007H

United States Statutory Invention Registration [19]

[11] Reg. Number: H1007

[43] Published: Jan. 7, 1992

Schadow et al.

[54] SOLID FUEL RAMJET COMBUSTOR

[75] Inventors: Klaus C. Schadow, Ridgecrest, Calif.; Ephraim Gutmark, Ra'anna, Israel; Kenneth J. Wilson, Ridgecrest, Calif.

[73] Assignee: The United States of America as represented by the Secretary of the Navy, Washington, D.C.

[21] Appl. No.: 737,648

[22] Filed: May 24, 1985

[51] Int. Cl.[5] ..... C06D 5/00; F02K 9/00

[52] U.S. Cl. ..... 60/210; 60/219; 60/253; 60/270.1

*Primary Examiner*—Donald P. Walsh

*Attorney, Agent, or Firm*—Robert F. Beers; W. Thom Skeer; Stephen J. Church

[57] ABSTRACT

In a solid fuel ramjet in which a fluid flow boundary layer extends along a burning fuel grain and receives combustible material liberated from the grain, exciting oscillations in air flowing toward the grain so that oscillations continue in the boundary layer and promote vortices in the layer to mix the air and the combustible material.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLID FUEL RAMJET COMBUSTOR

BACKGROUND OF THE INVENTION

1. Field of the Invention

This invention pertains to the field of reaction motors in which air is supplied by ram effect. More particularly, the invention pertains to the field of such motors operated with solid material in a reaction zone.

2. Description of the Prior Art

In an advantageous solid fuel ramjet construction, air from the ramjet inlet enters coaxially of and flows centrally along a burning tubular fuel grain which releases combustible material into the air for mixing and combustion therewith. In this construction the mixing and combustion occur in a boundary layer of fluid flow along the grain. In the prior art this layer has relatively low turbulence so that such mixing is relatively slow. However, rapid mixing is highly desirable for high combustion temperature and efficiency so as to obtain maximum energy from the fuel, to provide compact ramjet structure, and to ignite difficult to ignite combustible material, such as boron particles, liberated from the grain.

SUMMARY OF THE INVENTION

The excitation of oscillations in an air duct leading to a burning surface of a fuel grain in a solid fuel ramjet so that the oscillations continue in a shear layer of air flowing from the duct and drive vortices which propagate in a fluid flow along the surface to promote mixing between air and combustible material liberated from the grain.

It is an object of the subject invention to provide efficient combustion and effective ignition in a solid fuel ramjet in which mixing and combustion of combustible material liberated from a fuel grain and air occur in a fluid flow layer along the grain.

BRIEF DESCRIPTION OF THE DRAWING

Other objects, advantages, and novel features of the subject invention will be apparent from the following detailed description of the invention when considered with the accompanying drawing in which.

DESCRIPTION OF THE PREFERRED EMBODIMENT

Figure 1:
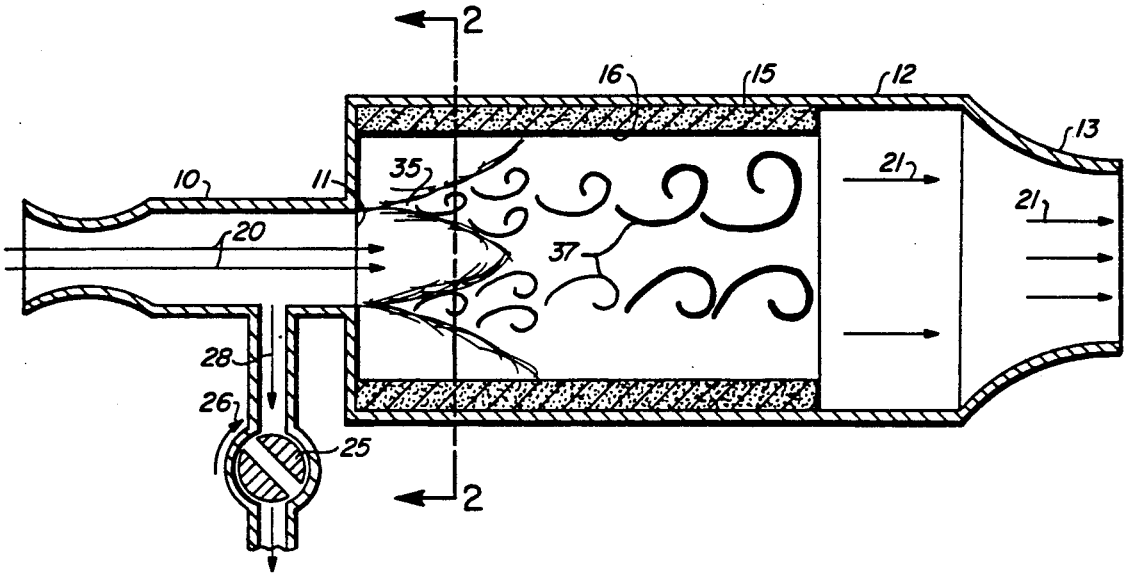
FIG. 1 is a somewhat schematic, longitudinal section of a ramjet embodying the subject invention.
Figure 2:
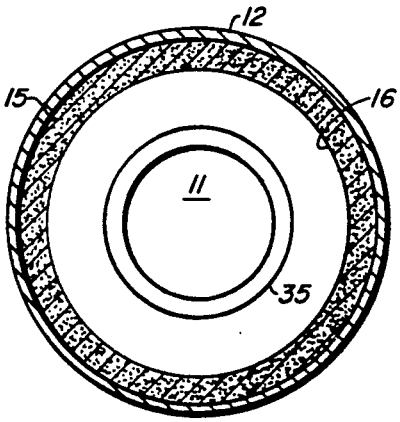
FIG. 2 is a section of the ramjet from the position of line 2—2 of FIG. 1.

FIG. 1 depicts a solid fuel ramjet which is of well known construction and is a representative operating environment for the subject invention. The ramjet has a forward inlet duct 10 which is cylindrically tubular, as shown in FIG. 2, and opens through a circular opening 11 into a cylindrically tubular combustion chamber 12 which is coaxially related to the duct and is substantially larger in diameter. An exhaust nozzle 13 is disposed rearwardly of chamber 12. The ramjet has a cylindrically tubular fuel grain 15 fitted coaxially within chamber 12 and extended axially from opening 11 a substantial distance toward nozzle 13. Grain 15 has an interior surface 16 which burns and releases fuel rich, fluid, combustible material centrally into chamber 12. This combustible material typically includes a hard to ignite component such as particles of metallic boron.

When the ramjet is operating, a flow of air indicated by arrow 20 passes substantially axially through duct 10 toward surface 15 for mixing and combustion along this surface with the previously described combustible material released therefrom. A flow of the products of such combustion, indicated by arrows 21, passes generally axially through chamber 12 and from nozzle 13. It is evident that the overall direction of flow through the ramjet is in a direction along and parallel to surface 15 and that air flow 20 issues from opening 11 into chamber 12. It is also evident that duct 10 is spaced transversely of the overall direction of flows 20 and 21 from burning fuel grain surface 15.

The ramjet has a rotary valve 25 which is driven in any suitable manner to move as indicated by arrow 26. Valve 25 is disposed for periodically opening and closing a passage 28 of the ramjet leading from duct 10 exteriorly thereof. Valve 25 thus serves to periodically release air from duct 10 through passage 28, as indicated by arrows 29, at a frequency predetermined by the angular velocity of valve 25. It is apparent that such periodic release of air from duct 10 will excite acoustic oscillations in air flow 20 at such frequency. It will be subsequently apparent that, for the practice of the subject invention, the exact location of the inlet of passage 28 in relation to duct 10, the point of outflow from this passage, the type of valve which corresponds to valve 25, and the manner of actuating such a valve may be varied so long as such oscillations are excited in duct 10 at a desired frequency. Such oscillations may also be excited by pressurized fluid from any suitable source supplied periodically to duct 10 through a valve such as valve 25 or by an externally powered diaphragm. Mechanical resonance with the structure of duct 10 or chamber 12 or acoustic resonance within the duct or chamber may also be used to force such oscillations so that no external driving energy or apparatus is required to excite the oscillations.

OPERATION

With the ramjet operating as before stated, a shear layer develops between flow 20 issuing from opening 11 and fluid disposed in chamber 12 immediately downstream of this opening and between such flow and surface 16. The shear layer develops initially at a location indicated by the numeral 35 in FIGS. 1 and 2. Such shear layer has vortices which combine and grow in size until, with the subject invention, the vortices substantially fill the interior of grain 15 in a region indicated by numeral 37 so that the flow therein is turbulent and substantially causes the mixing necessary for combustion between combustible material released from grain 15 and air flow 20.

Since opening 11 is circular, the initial vortices at 35 are substantially equal in size and period of shedding from flow 20 entering chamber 12 so that flow in region 37 is largely coherent, that is, the energy of the vortices is contained in a particular frequency band or bands. The period of rotation of valve 25 is selected so that the frequency of the acoustic oscillations excited thereby in duct 10 and upstream of surface 16 corresponds to the frequency of a predominant one of such bands and thereby forces the development of the corresponding vortices and so that the turbulence thereof is promoted to increase the rate of mixing and resulting combustion of the combustible material released from surface 16 and the air in flow 20.

Obviously many modifications and variations of the subject invention are possible in light of the above teachings. It is, therefore to be understood that within the scope of the following claims the invention may be practiced otherwise than as specifically set forth above.

We claim:

1. In a solid fuel ramjet having a burning fuel grain surface which liberates combustible material and having a duct through which air flows toward said surface in direction generally parallel thereto for mixing and combustion with said material along said surface, the improvement which comprises means connected to the duct for exciting, in air flowing through the duct, acoustic oscillations which promote turbulence along said surface to increase the rate of said mixing.

2. The ramjet of claim 1 wherein said surface is an interior cylindrical surface and the duct is cylindrical and is coaxially related to said surface.

3. The improvement of claim 1 wherein said means comprises a periodically opening and closing valve connected to said duct to periodically release air therefrom at a predetermined frequency.

4. A method of enhancing mixing and combustion between combustible fluid material and a flow of air in a solid fuel ramjet in which said material is released from a burning surface of a solid fuel grain and in which said flow has an overall direction along the surface, the method comprising the exciting of acoustic oscillations in said flow upstream of said surface to promote turbulence in said flow at said surface.

5. The method of claim 4 wherein, in said ramjet, said flow approaches said surface in a duct spaced transversely of said overall direction from said surface so that a shear layer develops between said flow issuing from said duct and fluid disposed between said duct and said surface, the layer having vortices which substantially cause said mixing and the method further comprising exciting said oscillations at a frequency which enhances the formation of said vortices.

6. The method of claim 5 wherein said ramjet has a chamber containing said grain and defines an opening through which said flow issues from said duct into said chamber and wherein the method further comprises configuring said opening so that said flow issuing therefrom is turbulent and coherent and selecting said frequency to correspond to a predominant frequency of such coherent flow.

* * * * *